United States Patent
Pu et al.

(10) Patent No.: US 12,297,079 B2
(45) Date of Patent: May 13, 2025

(54) ROLLER SPEED SENSOR WITH MAGNETS AND SENSORS

(71) Applicant: Otis Elevator Company, Farmington, CT (US)

(72) Inventors: Yu Pu, Farmington, CT (US); Justin Billard, Amston, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1260 days.

(21) Appl. No.: 17/060,740

(22) Filed: Oct. 1, 2020

(65) Prior Publication Data

US 2022/0106161 A1    Apr. 7, 2022

(51) Int. Cl.
*B66B 5/00* (2006.01)
*B66B 1/34* (2006.01)
*B66B 7/04* (2006.01)
*G01P 3/44* (2006.01)

(52) U.S. Cl.
CPC .......... *B66B 5/0018* (2013.01); *B66B 1/3492* (2013.01); *B66B 7/046* (2013.01); *G01P 3/44* (2013.01)

(58) Field of Classification Search
CPC ..... B66B 5/0018; B66B 1/3492; B66B 7/046; G01P 3/44
See application file for complete search history.

(56) References Cited

U.S. PATENT DOCUMENTS

| | | | | |
|---|---|---|---|---|
| 2018/0244495 | A1* | 8/2018 | Swaybill | B66B 1/3492 |
| 2019/0234985 | A1* | 8/2019 | Billard | B66B 5/0018 |
| 2019/0322484 | A1* | 10/2019 | Sr | B66B 1/28 |

FOREIGN PATENT DOCUMENTS

| | | | |
|---|---|---|---|
| CN | 107487688 A | 12/2017 | |
| CN | 110745658 A | 2/2020 | |
| DE | 29715349 U1 | 10/1997 | |
| EP | 3536649 A2 | 9/2019 | |
| EP | 3560873 A1 | 10/2019 | |
| JP | H04246079 A | 9/1992 | |
| JP | 2008239260 A | 10/2008 | |
| WO | WO-2007063574 A1 * | 6/2007 | B66B 1/3492 |

OTHER PUBLICATIONS

Chinese Office Action for Application No. 202110818862.5, Issued Mar. 27, 2024, 8 Pages.
European Search Report for Application No. 21199528.7; Issued Feb. 23, 2022; 6 Pages.

* cited by examiner

*Primary Examiner* — Jeffrey Donels
(74) *Attorney, Agent, or Firm* — CANTOR COLBURN LLP

(57) ABSTRACT

A roller speed sensor for detecting a speed of an elevator car of an elevator system including: a first roller configured to rotate along a guide rail of the elevator system when the elevator car moves up or down an elevator shaft, the first roller including: one or more magnets; and a first sensor pair located proximate the first roller, the first sensor pair being configured to detect a rotational speed of the one or more magnets.

15 Claims, 5 Drawing Sheets

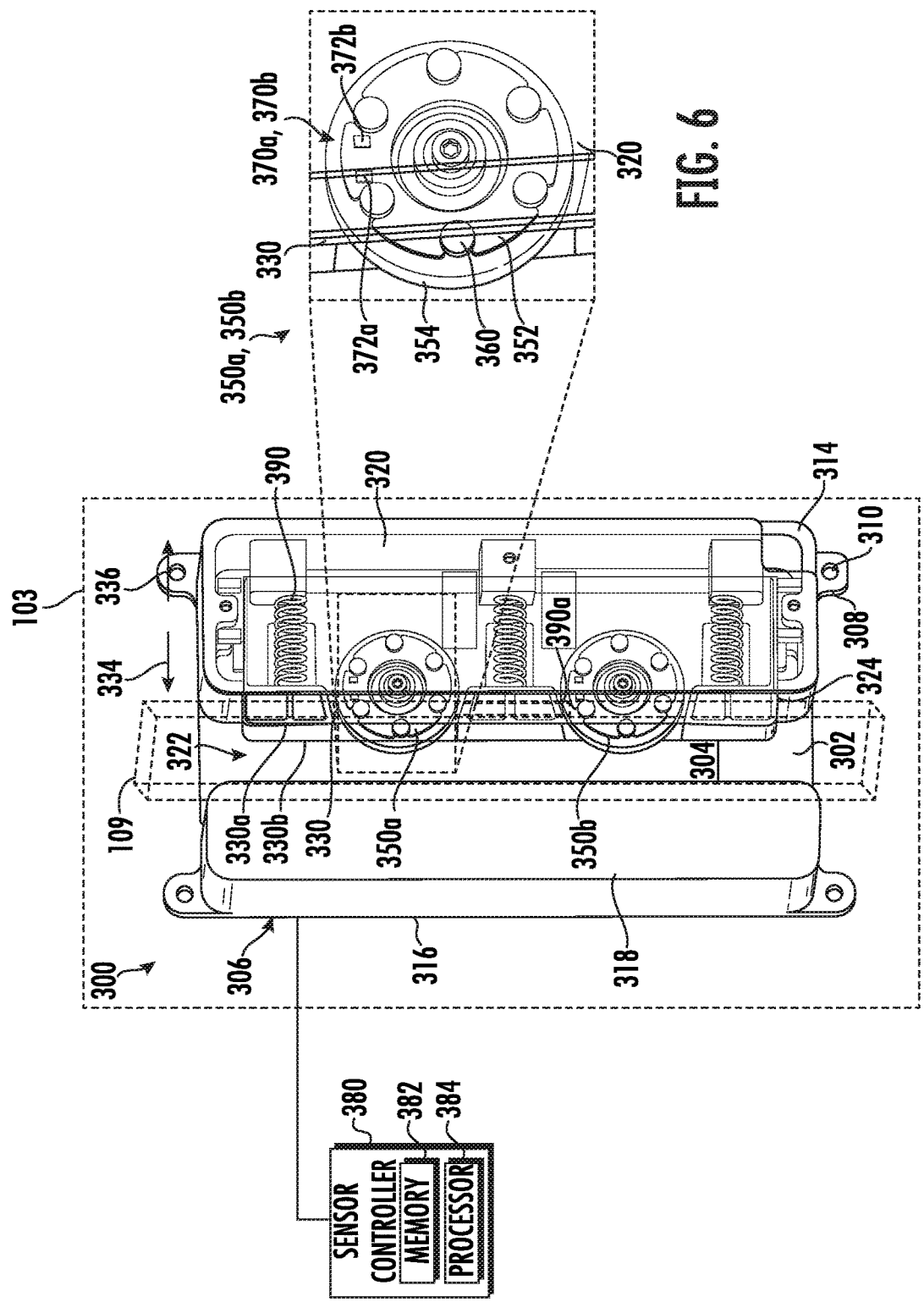

ROLLER SPEED SENSOR WITH MAGNETS AND SENSORS

BACKGROUND

The subject matter disclosed herein relates generally to the field of elevator systems, and specifically to a method and apparatus for speed detection of elevator cars of an elevator system.

The location and speed of an elevator car in an elevator system may be detected utilizing an absolute position system that may include a marked tape located in the elevator shaft and an associated camera located on the elevator car. The tape typically runs an operating length of the elevator shaft and is marked with identifying symbols readable by the camera. The identifying symbols indicate the current location within the elevator shaft, and thus the absolute position system may determine location and speed of the elevator car by commanding the camera to read the marked tape.

Alternatively, the location and speed of an elevator car in an elevator system may be detected utilizing an encoder, which is located on the machine at the top of the elevator shaft as a primary means of speed measurement. Elevator systems may also use a centrifugal governor, which measures the speed of the elevator mechanically (e.g., using flyweights on a sheave that are held in by springs).

BRIEF SUMMARY

According to an embodiment, a roller speed sensor for detecting a speed of an elevator car of an elevator system is provided. The roller speed sensor including: a first roller configured to rotate along a guide rail of the elevator system when the elevator car moves up or down an elevator shaft, the first roller including: one or more magnets; and a first sensor pair located proximate the first roller, the first sensor pair being configured to detect a rotational speed of the one or more magnets.

In addition to one or more of the features described herein, or as an alternative, further embodiments may include a base plate including a first side, a second side opposite the first side, a first end and a second end opposite the first end; a first housing located on the first side proximate the first end; and a second housing located on the first side proximate the second end, the first housing and the second housing being separated by a gap, wherein the guide rail is configured to fit within the gap.

In addition to one or more of the features described herein, or as an alternative, further embodiments may include that the first housing further including: an opening adjacent to the gap, wherein the first roller is located at least partially within the first housing and configured to project through the opening in the first housing and into the gap to contact the guide rail.

In addition to one or more of the features described herein, or as an alternative, further embodiments may include a roller carriage, wherein the first roller is attached to the base plate or the first housing via the roller carriage.

In addition to one or more of the features described herein, or as an alternative, further embodiments may include a biasing mechanism, wherein the roller carriage is attached to the base plate or the first housing via the biasing mechanism.

In addition to one or more of the features described herein, or as an alternative, further embodiments may include that the first sensor pair is attached to the second side of the base plate.

In addition to one or more of the features described herein, or as an alternative, further embodiments may include that the second side of the base plate further includes a recess, and wherein the first sensor pair is located in the recess.

In addition to one or more of the features described herein, or as an alternative, further embodiments may include that the first sensor pair is a fixed tunneling magnetoresistance sensor.

In addition to one or more of the features described herein, or as an alternative, further embodiments may include that the first roller further includes a first flat surface and a second flat surface located opposite the first flat surface, wherein the first flat surface is closer to the base plate than the second flat surface, and wherein the magnets are embedded in the first flat surface.

In addition to one or more of the features described herein, or as an alternative, further embodiments may include that the first sensor pair is attached to the roller carriage.

In addition to one or more of the features described herein, or as an alternative, further embodiments may include that the first sensor pair includes a first hall effect sensor and a second hall effect sensor.

In addition to one or more of the features described herein, or as an alternative, further embodiments may include that the first roller further includes a first flat surface and a second flat surface located opposite the first flat surface, wherein the second flat surface is closer to the base plate than the first flat surface, and wherein the magnets are embedded in the first flat surface.

In addition to one or more of the features described herein, or as an alternative, further embodiments may include that the roller speed sensor is configured to be mounted with the second side against the elevator car.

In addition to one or more of the features described herein, or as an alternative, further embodiments may include a second roller configured to rotate along a guide rail of the elevator system when the elevator car moves up or down an elevator shaft, the second roller including: one or more second magnets; and a second sensor pair located proximate the first roller, the second sensor pair being configured to detect a rotational speed of the one or more second magnets of the second roller.

In addition to one or more of the features described herein, or as an alternative, further embodiments may include a base plate including a first side, a second side opposite the first side, a first end and a second end opposite the first end; a first housing located on the first side proximate the first end; a second housing located on the first side proximate the second end, the first housing and the second housing being separated by a gap, wherein the guide rail is configured to fit within the gap.

In addition to one or more of the features described herein, or as an alternative, further embodiments may include that the first housing further including: an opening adjacent to the gap, wherein the first roller and the second roller are located at least partially within the first housing and configured to project through the opening in the first housing and into the gap to contact the guide rail.

In addition to one or more of the features described herein, or as an alternative, further embodiments may include a roller carriage, wherein the first roller and the second roller are attached to the base plate or the first housing via the roller carriage.

In addition to one or more of the features described herein, or as an alternative, further embodiments may include a biasing mechanism, wherein the roller carriage is attached to the base plate or the first housing via the biasing mechanism.

In addition to one or more of the features described herein, or as an alternative, further embodiments may include that the first sensor pair is attached to the second side of the base plate.

According to another embodiment, a method for detecting a speed of an elevator car of an elevator system is provided. the method including: compressing a first roller against a guide rail of the elevator system, such that the first roller is configured to rotate along the guide rail of the elevator system when the elevator car moves up or down an elevator shaft, the first roller including: one or more magnets; detecting a rotational speed of the one or more magnets using a first sensor pair located proximate the first roller; and determining the speed of the elevator car in response to the rotational speed of the one or more magnets.

Technical effects of embodiments of the present disclosure include detecting a speed of an elevator car by measuring rolling speed along a guide rail.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 5 illustrates an isometric view of a roller speed sensor, in accordance with an embodiment of the disclosure;

FIG. 6 illustrates an isometric view of a roller of the roller speed sensor of FIG. 5, in accordance with an embodiment of the disclosure.

DETAILED DESCRIPTION

Figure 1:
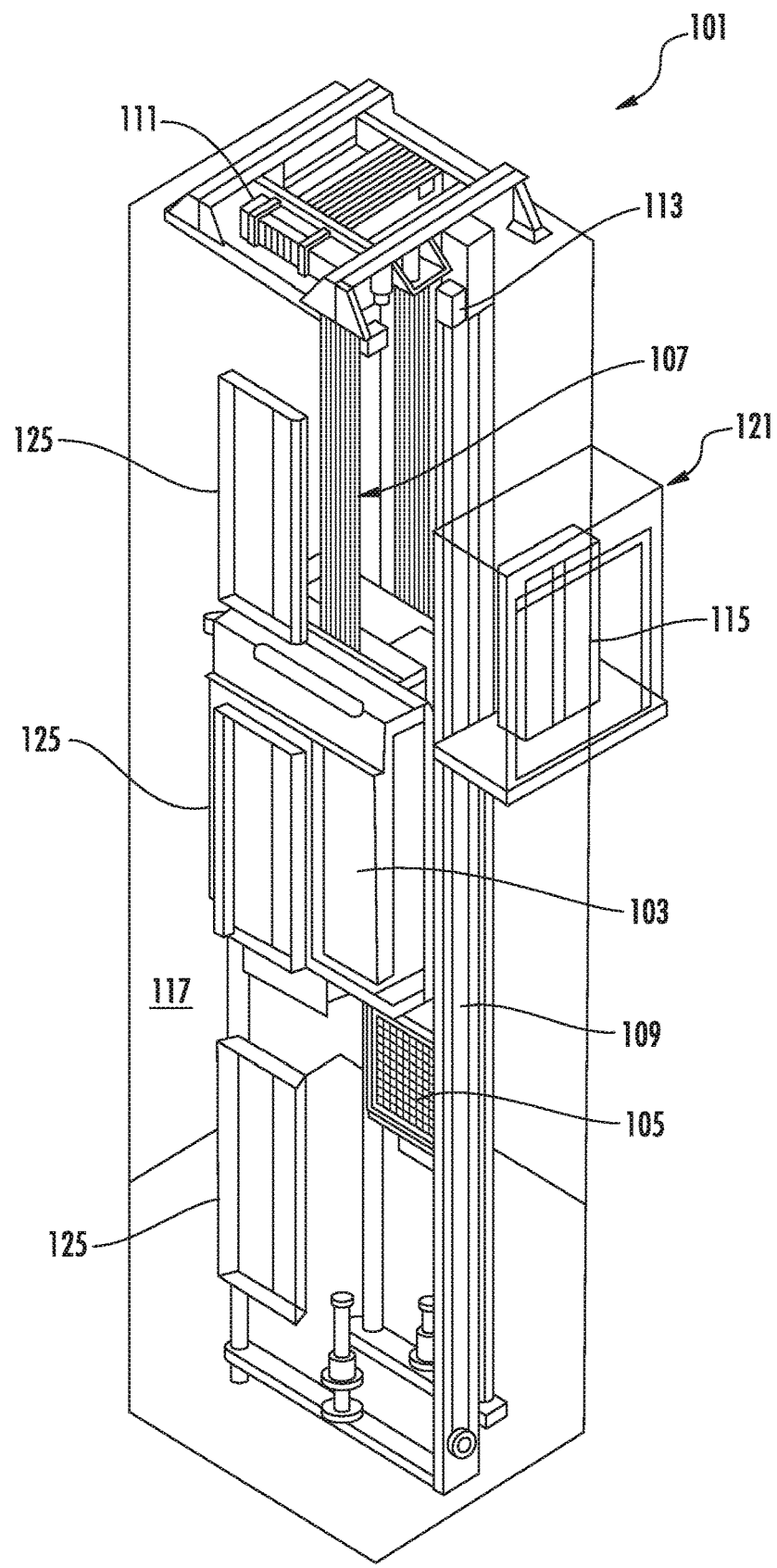
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels or traction wheels). FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

Figure 2:
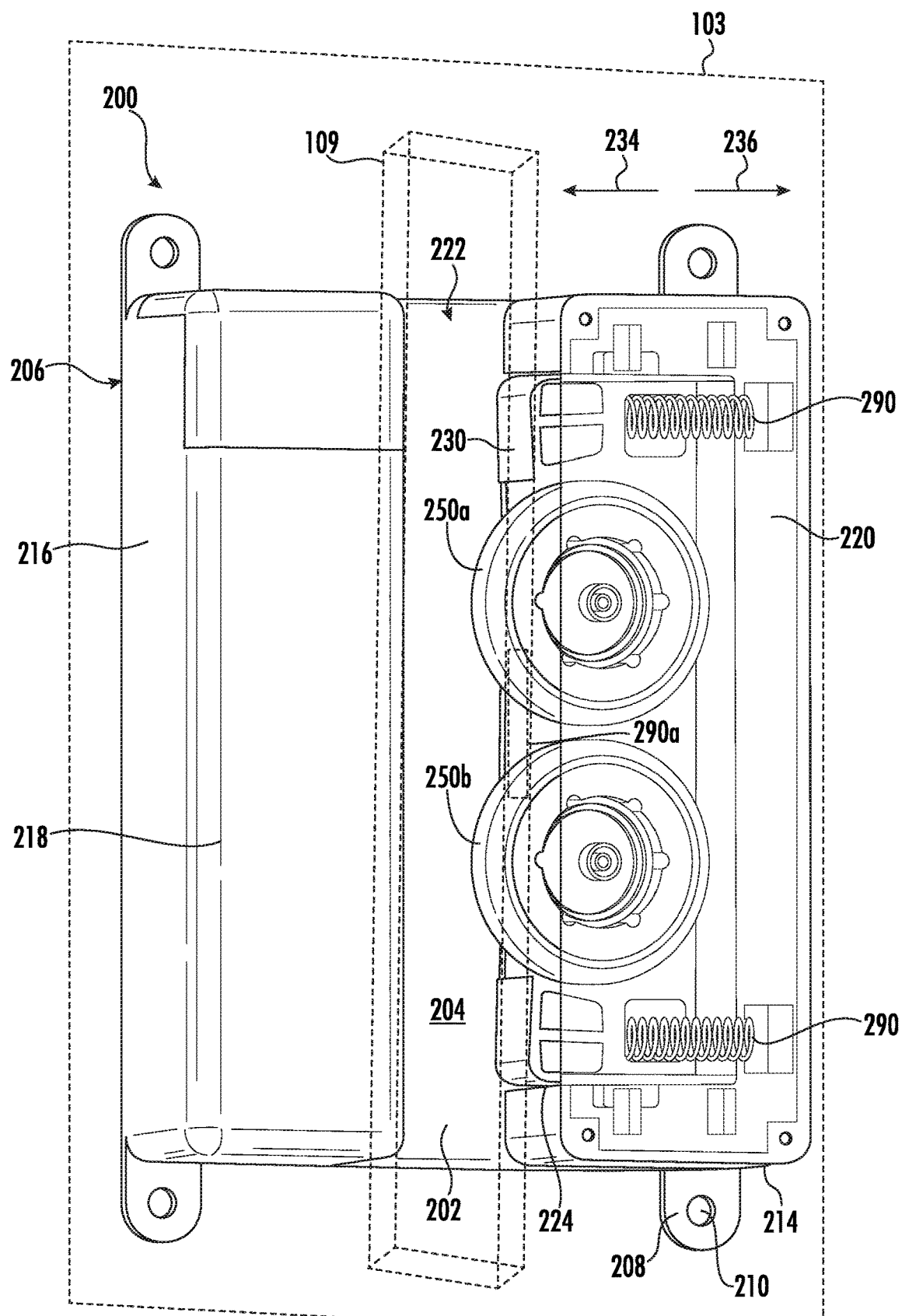
FIG. 2 illustrates an isometric view of a roller speed sensor, in accordance with an embodiment of the disclosure.
Figure 3:
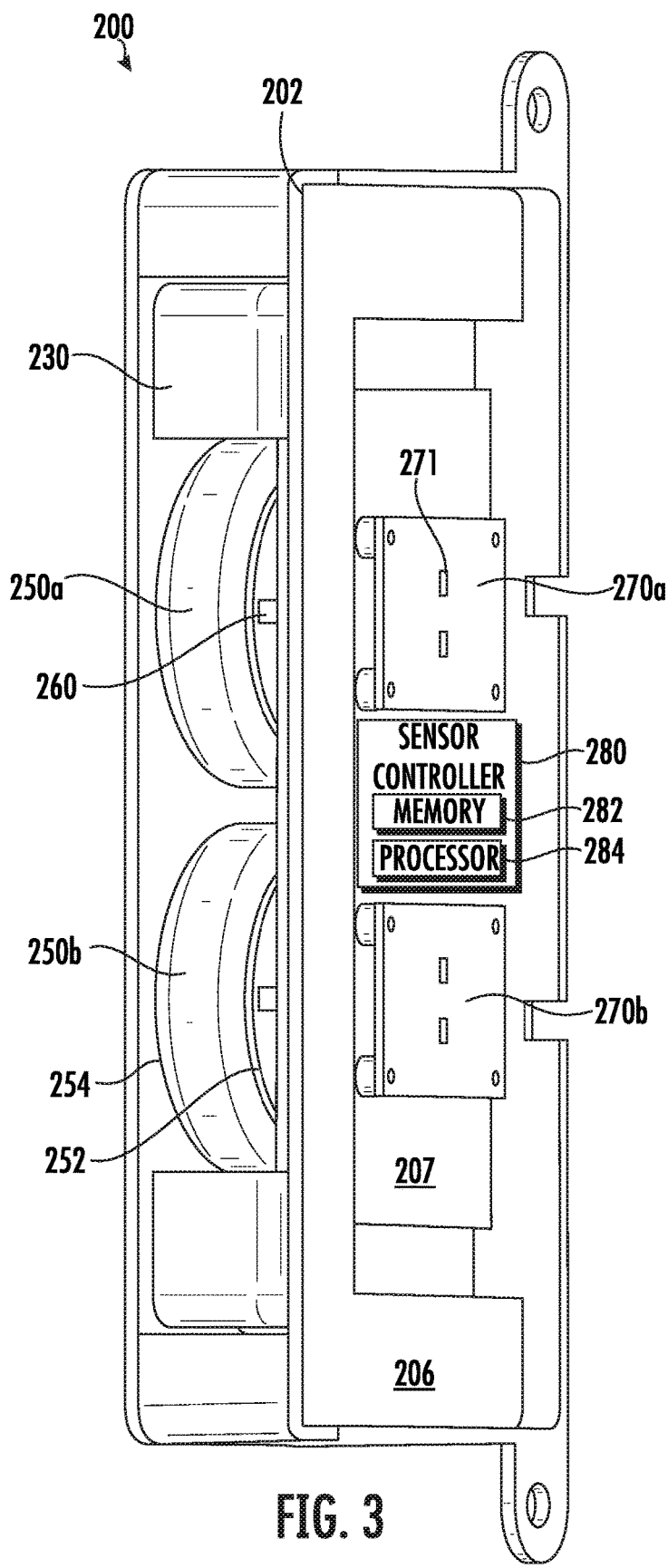
FIG. 3 illustrates a view of a back the roller speed sensor of FIG. 2, in accordance with an embodiment of the disclosure.

Referring now to FIGS. 2-3, with continued reference to FIG. 1, a roller speed sensor 200 and a roller 250a, 250b are illustrated, in accordance with an embodiment of the present disclosure. It should be appreciated that, although particular systems are separately defined in the schematic block diagrams, each or any of the systems may be otherwise combined or separated via hardware and/or software. The roller speed sensor 200 is configured to detect a speed of the elevator car 103 through the use of one or more rollers 250a, 250b. The roller 250a, 250b is configured to rotate along a guide rail 109 of the elevator system 101 when the elevator car 103 moves up or down the elevator shaft 117. The roller speed sensor 200 is attached to the elevator car 103 and is located between the elevator car 103 and the guide rail 109. The roller speed sensor 200 is configured to compress the one or more rollers 250a, 250b against the guide rail 109 such that as the elevator car 103 moves up and down the elevator shaft 117 (see FIG. 1) the rollers 250a, 250b will rotate against the guide rail 109.

As illustrated in FIG. 2, the roller speed sensor 200 includes a base plate 202 having a first side 204 and a second side 206 (see FIG. 2) opposite the first side 204. The base plate 202 may be about flat and about rectangular in shape, as shown in FIG. 2. The base plate 202 may include one or more mounting points 208 configured to allow the roller speed sensor 200 to be mounted to the elevator car 103. The mounting point 208 may include an orifice 210 to fit a fastener through in order to mount the roller speed sensor 200 to the elevator car 103. The roller speed sensor 200 is configured to be mounted with the second side 206 against the elevator car 103.

The base plate 202 includes a first end 214 and a second end 216 opposite the first end 214. The base plate 202 includes a first housing 220 located on the first side 204 proximate the first end 214 and a second housing 218 located on the first side 206 proximate the second end 216. The second housing 218 may be used to store electrical components, such as, for example capacitors or batteries. The first housing 220 and the second housing 218 are separated by a gap 222 located therebetween. The guide rail 109 is configured to fit within the gap 222. The first housing 220 includes an opening 224 adjacent to the gap 222.

The roller 250a, 250b is located at least partially within the first housing 220 and configured to project through the opening 224 and into the gap 222 to contact the guide rail 109. The roller speed sensor 200 may include one or more rollers 250a, 250b. In an embodiment, the roller speed sensor 200 may only include one roller or in other words, the roller speed sensor 200 may only include the first roller 250a of the second roller 250b. In an embodiment, the roller speed sensor 200 may include two rollers 250a, 250b for redundancy. As shown in FIGS. 2 and 3, the roller speed sensor 200 may include a first roller 250a and a second roller 250b. The rollers 250a, 250b may be attached to the base plate 202 or the first housing 220 via a roller carriage 230. The roller carriage 230 is configured to move in a first direction 234 towards the guide rail 109 and a second direction 236 away from the guide rail 109.

The roller carriage 230 may be attached to the base plate 202 or the first housing 220 via a biasing mechanism 290. The biasing mechanism 290 is configured to compress the rollers 250a, 250b against the guide rail 109, while also working as a shock absorbing to absorbing waviness in the guide rail 109, while maintaining contact between the rollers 250a, 250b and the guide rail 109. The biasing mechanism 290 may be one or more springs, magnets, hydraulic pressure, pneumatic pressure, electrical pressure, or any similar biasing mechanism 290 known to one of skill in the art. The springs may be helical springs, conical springs, leaf springs, disc springs or any other type of spring known to one of skill in the art. As an alternative to the biasing mechanism 290 illustrated in FIG. 2, a magnet 290a may be attached to the roller carriage 230 and located proximate the guide rail 109, as illustrated in FIG. 2, so that the magnets 290a pulls the roller carriage 230 towards the guide rail 109. This is as opposed to the biasing mechanism 290 illustrated in FIG. 2 that is a spring, which pushed the roller carriage 230 towards the guide rail 109. The biasing mechanism 290 allows the rollers 250a, 250b to float in a first direction 234 and a second direction 236 opposite the first direction 234.

Figure 4:
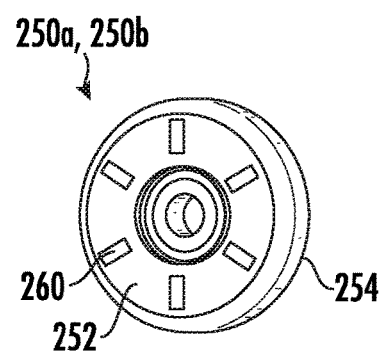
FIG. 4 illustrates an isometric view of a roller of the roller speed sensor of FIGS. 2 and 3, in accordance with an embodiment of the disclosure.

Referring now to FIGS. 3 and 4 with continued reference to FIGS. 1-2. The first roller 250a and the second roller 250b of the roller speed sensor 200 include one or more magnets 260. In an embodiment, the first roller 250a and the second roller 250b may include six magnets 260. The magnets 260 may be equidistantly spaced circumferentially around the roller 250a, 250b. The first roller 250a and the second roller 250b include a first flat surface 252 and a second flat surface 254. The first flat surface 252 is located closer to the base plate 202 than the second flat surface 254. In other words, the first flat surface 252 is facing the base plate 202 and the second flat surface 254 is facing away from the base plate 202, as illustrated in FIG. 3. The one or more magnets 260 may be embedded in the first flat surface 252, as illustrated in FIG. 4.

The roller speed sensor 200 includes a sensor pair 270a, 270b for each roller 250a, 250b. If there is only one roller 250a, 250b, then there will only be one sensor pair 270a, 270b The sensor pair 270a, 270b are located on the second side 206 of the base plate 202. The sensor pair 270a, 270b may be located in a recess 207 in the second side 206 of the base plate 202. Advantageously, this allows that second side 206 of the base plate 202 to be mounted flush against the elevator car 103 and encapsulating the sensor pair 270a, 270b in the recess 207, which protects the sensor pair 270a, 270b from environmental contaminates that may be located in the elevator shaft 117 (see FIG. 1). Environmental contaminates may include but are not limited to dust, metal debris, guide rail oil, or any other contaminates.

The roller speed sensor 200 includes a first sensor pair 270a and a second sensor pair 270b. The first sensor pair 270a is located proximate the first roller 250a and the second sensor pair 270b is located proximate the second roller 250b.

The first sensor pair 270a is configured to detect the one or more magnets 260 of the first roller 250a. Also, the first sensor pair 270a is configured to detect rotation of the one or more magnets 260 of the first roller 250a. Further, the first sensor pair 270a is configured to detect rotational speed of the one or more magnets 260 of the first roller 250a. The speed of the elevator car 103 may be determined from the rotational speed of the one or more magnets 260 of the first roller 250a.

The second sensor pair 270b is configured to detect the one or more magnets 260 of the second roller 250b. Also, the second sensor pair 270b is configured to detect rotation of the one or more magnets 260 of the second roller 250b. Further, the second sensor pair 270b is configured to detect rotational speed of the one or more magnets 260 of the second roller 250b. The speed of the elevator car 103 may be determined from the rotational speed of the one or more magnets 260 of the second roller 250b.

The speed of the elevator car 103 may be determined by a sensor controller 280. The controller 280 is configured to determine a speed of the elevator car 103 in response to the rotation speed of the one or more magnets 260. The controller 280 may be located on the second side 206. The sensor controller 280 is in communication with the sensor pairs 270a, 270b and may be in communication with the controller 115 of the elevator system 101. The sensor controller 280 may be a circuit board or more specifically a safety actuation board, which may be utilized to actuate a safety brake of the elevator car 103.

The sensor controller 280 may be an electronic controller including a processor 284 and an associated memory 282 comprising computer-executable instructions (i.e., computer program product) that, when executed by the processor, cause the processor 284 to perform various operations. The processor 284 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 282 may be but is not limited to a random access memory (RAM), read only memory (ROM), or other electronic, optical, magnetic or any other computer readable medium.

In an embodiment, first sensor pair 270a may be a fixed tunneling magnetoresistance sensor. In an embodiment, the second sensor pair 270b may be a fixed tunneling magnetoresistance sensor. The first sensor pair 270a and the second sensor pair 270b includes two individual tunnel magnetoresistance sensors 271 in order to determine which direction the rollers 250a, 250b are rotating, so that it may be determined in which direction the elevator car 103 is moving.

Referring now to FIG. 5, with continued reference to FIG. 1, a roller speed sensor 300 having a first roller 350a and a second roller 350b is illustrated, in accordance with an embodiment of the present disclosure. It should be appreciated that, although particular systems are separately defined in the schematic block diagrams, each or any of the systems may be otherwise combined or separated via hardware and/or software. The roller speed sensor 300 is configured to detect a speed of the elevator car 103 through the use of one or more rollers 350a, 350b. The roller 350a, 350b is configured to rotate along a guide rail 109 of the elevator system 101 when the elevator car 103 moves up or down the elevator shaft 117. The roller speed sensor 300 is attached to the elevator car 103 and is located between the elevator car 103 and the guide rail 109. The roller speed sensor 300 is configured to compress the one or more rollers 350a, 350b against the guide rail 109 such that as the elevator car 103 moves up and down the elevator shaft 117 (see FIG. 1) the rollers 350a, 350b will rotate against the guide rail 109.

As illustrated in FIG. 5, the roller speed sensor 300 includes a base plate 302 having a first side 304 and a second side 306 opposite the first side 304. The base plate 302 may be about flat and about rectangular in shape, as shown in FIG. 5. The base plate 302 may include one or more mounting points 308 configured to allow the roller speed sensor 300 to be mounted to the elevator car 103. The mounting point 308 may include an orifice 310 to fit a fastener through in order to mount the roller speed sensor 300 to the elevator car 103. The roller speed sensor 300 may be mounted with the second side 306 against the elevator car 103.

The base plate 302 includes a first end 314 and a second end 316 opposite the first end 314. The base plate 302 includes a first housing 320 located on the first side 304 proximate the first end 314 and a second housing 318 located on the first side 304 proximate the second end 316. The second housing 318 may be used to store electrical components, such as, for example capacitors or batteries. The first housing 320 and the second housing 318 are separated by a gap 322 located therebetween. The guide rail 109 is configured to fit within the gap 322. The first housing 320 includes an opening 324 adjacent to the gap 322.

The roller 350a, 350b is located at least partially within the first housing 320 and configured to project through the opening 324 in the first housing 320 and into the gap 322 to contact the guide rail 109. The roller speed sensor 300 may include one or more rollers 350a, 350b. In an embodiment, the roller speed sensor 300 may only include one roller or in other words, the roller speed sensor 300 may only include the first roller 350a or the second roller 350b. In an embodiment, the roller speed sensor 300 include two rollers 350a, 350b for redundancy. As shown in FIG. 5, the roller speed sensor 300 may include a first roller 350a and a second roller 350b. The rollers 350a, 350b may be attached to the base plate 302 or the first housing 320 via a roller carriage 330. The roller carriage 330 is configured to move in a first direction 335 towards the guide rail 109 and a second direction 336 away from the guide rail 109.

The roller carriage 330 may be attached to the base plate 302 or the first housing 320 via a biasing mechanism 390. The biasing mechanism 390 is configured to compress the rollers 350a, 350b against the guide rail 109, while also working as a shock absorbing to absorbing waviness in the guide rail 109, while maintaining contact between the rollers 350a, 350b and the guide rail 109. The biasing mechanism 390 may be one or more springs, magnets, hydraulic pressure, pneumatic pressure, electrical pressure, or any similar biasing mechanism 390 known to one of skill in the art. The springs may be helical springs, conical springs, leaf springs, disc springs or any other type of spring known to one of skill in the art. As an alternative to the biasing mechanism 390 illustrated in FIG. 5, a magnet 390a may be attached to the roller carriage 330 and located proximate the guide rail 109, as illustrated in FIG. 5, so that the magnets 390a pulls the roller carriage 330 towards the guide rail 109. This is as opposed to the biasing mechanism 390 illustrated in FIG. 5 that is a spring, which pushed the roller carriage 330 towards the guide rail 109. The biasing mechanism 390 allows the rollers 350a, 350b to float in a first direction 334 and a second direction 336 opposite the first direction 334.

Referring now to FIG. 6 with continued reference to FIGS. 1 and 5. The first roller 350a and the second roller 350b of the roller speed sensor 300 include one or more magnets 360. In an embodiment, the first roller 350a and the second roller 350b may include six magnets 360. The magnets 360 may be equidistantly spaced circumferentially around the roller 350a, 350b. The first roller 350a and the second roller 350b include a first flat surface 352 and a second flat surface 354. The second flat surface 354 is located closer to the base plate 302 than the first flat surface 352. In other words, the second flat surface 354 is facing the base plate 302 and the first flat surface 352 is facing away from the base plate 302, as illustrated in FIG. 6. The one or more magnets 360 may be embedded in the first flat surface 352, as illustrated in FIG. 6.

The roller speed sensor 300 includes a sensor pair 370a, 370b for each roller 350a, 350b. If there is only one roller 350a, 350b, then there will only be one sensor pair 370a, 370b. The sensor pair 370a, 370b are located in a front side 330a of the roller carriage 330 proximate the first housing 320, which advantageously allows the sensor pair 370a, 370b to move with the roller carriage 330 and the rollers 350a, 350b.

Alternatively, the one or more magnets may be embedded in the second flat surface 354 of the rollers 350a, 350b and then the sensor pairs 370a, 370b may be located in a back side of the roller carriage 330b. The back side 330b is located opposite the front side 330a.

The roller speed sensor 300 includes a first sensor pair 370a and a second sensor pair 370b. The first sensor pair 370a is located proximate the first roller 350a and the second sensor pair 370b is located proximate the second roller 350b.

The first sensor pair 370a is configured to detect the one or more magnets 360 of the first roller 350a. Also, the first sensor pair 370a is configured to detect rotation of the one or more magnets 360 of the first roller 350a. Further, the first sensor pair 370a is configured to detect rotational speed of the one or more magnets 360 of the first roller 350a. The speed of the elevator car 103 may be determined from the rotational speed of the one or more magnets 360 of the first roller 350a.

The second sensor pair 370b is configured to detect the one or more magnets 360 of the second roller 350b. Also, the second sensor pair 370b is configured to detect rotation of the one or more magnets 360 of the second roller 350b. Further, the second sensor pair 370b is configured to detect rotational speed of the one or more magnets 360 of the second roller 350b. The speed of the elevator car 103 may be determined from the rotational speed of the one or more magnets 360 of the second roller 350b.

The speed of the elevator car 103 may be determined by a sensor controller 380. The controller 380 is configured to determine a speed of the elevator car 103 in response to the rotation speed of the one or more magnets 360. The controller 380 may be located on the second side 306. The sensor controller 380 is in communication with the sensor pairs 370a, 370b and may be in communication with the controller 115 of the elevator system 101. The sensor controller 380 may be a circuit board or more specifically a safety actuation board, which may be utilized to actuate a safety brake of the elevator car 103.

The sensor controller 380 may be an electronic controller including a processor 384 and an associated memory 382 comprising computer-executable instructions (i.e., computer program product) that, when executed by the processor, cause the processor 384 to perform various operations. The processor 384 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 382 may be but is not limited to a random access memory (RAM), read only memory (ROM), or other electronic, optical, magnetic or any other computer readable medium.

In an embodiment, sensor pair 370 includes a first hall effect sensor 372a and a second hall effect sensor 372b.

Figure 7:
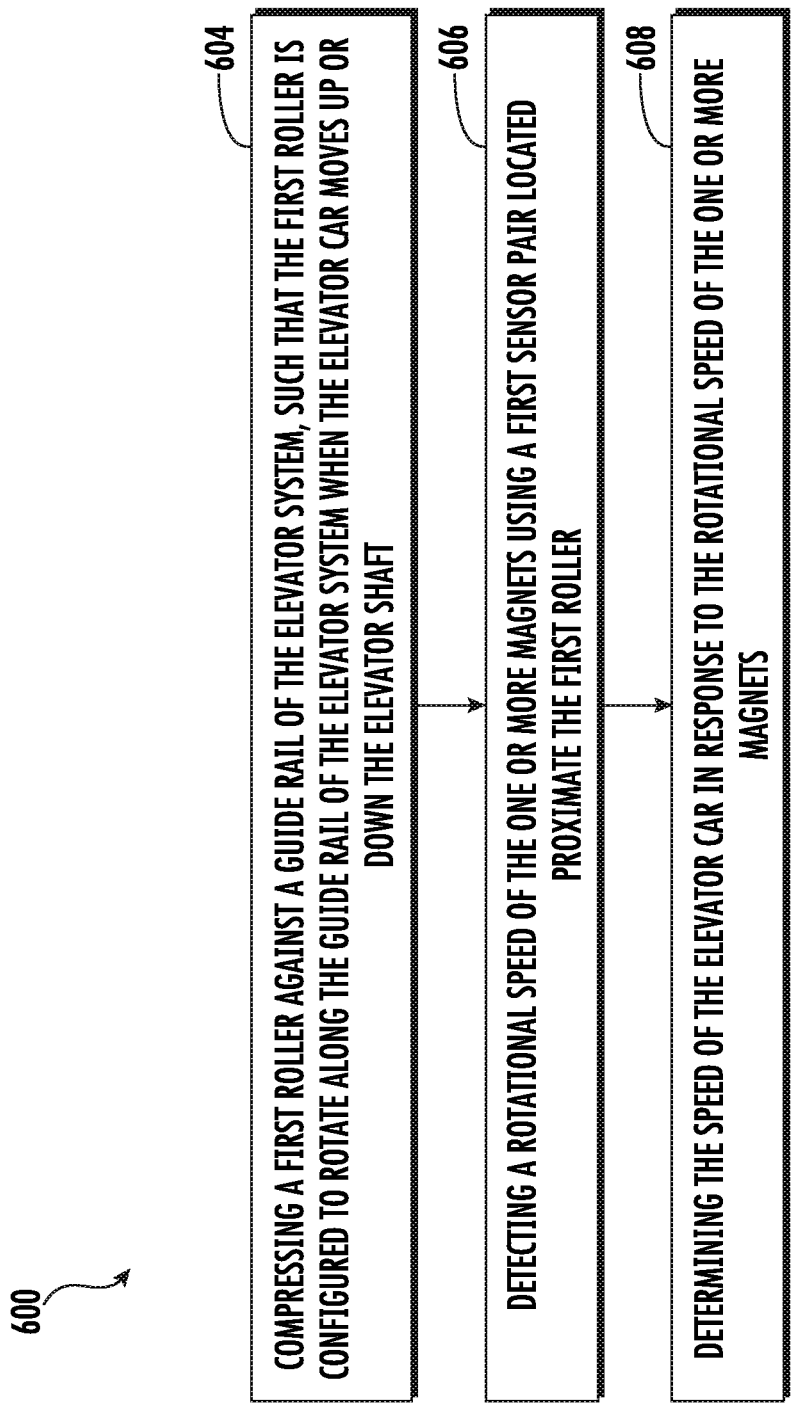
FIG. 7 is a flow chart of method of detecting a speed of the elevator car, in accordance with an embodiment of the disclosure.

Referring now to FIG. 7, with continued reference to FIGS. 1-6, a flow chart of method 600 of detecting a speed of an elevator car 103 of an elevator system 101 is illustrated, in accordance with an embodiment of the disclosure. In an embodiment, the method 600 is performed by the roller speed sensor 200 of FIG. 2-6.

At block 604, a first roller 250a, 350a is compressed against a guide rail 109 of the elevator system 101, such that the first roller 250a, 350a is configured to rotate along the guide rail 109 of the elevator system 101 when the elevator car 103 moves up or down the elevator shaft 117. The first roller 250, 350 comprising: one or more magnets 260, 360.

At block 606, a rotational speed of the one or more magnets 260, 360 is detected using a first sensor pair 270a, 370 located proximate the first roller 250, 350.

At block 608, the speed of the elevator car 103 is determined in response to the rotational speed of the one or more magnets 260, 360. In an embodiment, The speed of the elevator car 103 may be communicated to an emergency safety actuator of the elevator system 101 and the emergency safety actuator may be activated to stop the elevator car in response to the speed of the elevator car detected by the roller speed sensor 200.

While the above description has described the flow process of FIG. 7 in a particular order, it should be appreciated that unless otherwise specifically required in the attached claims that the ordering of the steps may be varied.

The present invention may be a system, a method, and/or a computer program product at any possible technical detail level of integration. The computer program product may include a computer readable storage medium (or media) having computer readable program instructions thereon for causing a processor to carry out aspects of the present invention.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A roller speed sensor for detecting a speed of an elevator car of an elevator system, the roller speed sensor comprising:
    a first roller configured to rotate along a guide rail of the elevator system when the elevator car moves up or down an elevator shaft, the first roller comprising:
    one or more magnets; and
    a first sensor pair located proximate the first roller, the first sensor pair being configured to detect a rotational speed of the one or more magnets;
    a base plate comprising a first side, a second side opposite the first side, a first end and a second end opposite the first end;
    a first housing located on the first side proximate the first end; and
    a second housing located on the first side proximate the second end, the first housing and the second housing being separated by a gap,
    wherein the guide rail is configured to fit within the gap;
    a roller carriage, wherein the first roller is attached to the base plate or the first housing via the roller carriage;
    a biasing mechanism, wherein the roller carriage is attached to the base plate or the first housing via the biasing mechanism.

2. The roller speed sensor of claim 1, wherein the first housing further comprising:
    an opening adjacent to the gap, wherein the first roller is located at least partially within the first housing and configured to project through the opening in the first housing and into the gap to contact the guide rail.

3. The roller speed sensor of claim 1, wherein:
    the first sensor pair is attached to the second side of the base plate.

4. The roller speed sensor of claim 3, wherein the second side of the base plate further comprises a recess, and
    wherein the first sensor pair is located in the recess.

5. The roller speed sensor of claim 4, wherein the first sensor pair is a fixed tunneling magnetoresistance sensor.

6. The roller speed sensor of claim 4, wherein the first roller further comprises a first flat surface and a second flat surface located opposite the first flat surface, wherein the first flat surface is closer to the base plate than the second flat surface, and wherein the magnets are embedded in the first flat surface.

7. The roller speed sensor of claim 1, wherein:
    the first sensor pair is attached to the roller carriage.

8. The roller speed sensor of claim 7, wherein the first sensor pair includes a first hall effect sensor and a second hall effect sensor.

9. The roller speed sensor of claim 8, wherein the first roller further comprises a first flat surface and a second flat surface located opposite the first flat surface, wherein the second flat surface is closer to the base plate than the first flat surface, and wherein the magnets are embedded in the first flat surface.

10. The roller speed sensor of claim 3, wherein the roller speed sensor is configured to be mounted with the second side against the elevator car.

11. The roller speed sensor of claim 1, further comprising:
    a second roller configured to rotate along a guide rail of the elevator system when the elevator car moves up or down an elevator shaft, the second roller comprising:
    one or more second magnets; and
    a second sensor pair located proximate the first roller, the second sensor pair being configured to detect a rotational speed of the one or more second magnets of the second roller.

12. The roller speed sensor of claim 11, wherein the first housing further comprising:
    an opening adjacent to the gap, wherein the first roller and the second roller are located at least partially within the first housing and configured to project through the opening in the first housing and into the gap to contact the guide rail.

13. The roller speed sensor of claim 12,
    wherein the first roller and the second roller are attached to the base plate or the first housing via the roller carriage.

14. The roller speed sensor of claim 13, wherein:
    the first sensor pair is attached to the second side of the base plate.

15. A method for detecting a speed of an elevator car of an elevator system using the roller speed sensor of claim 1, the method comprising:
    compressing the first roller against the guide rail of the elevator system;
    detecting a rotational speed of the one or more magnets using the first sensor pair; and
    determining the speed of the elevator car in response to the rotational speed of the one or more magnets.

* * * * *